United States Patent
Gao et al.

(10) Patent No.: US 7,203,782 B1
(45) Date of Patent: *Apr. 10, 2007

(54) QUEUEING METHOD SUPPORTING MULTIPLE CLIENT ACCESSES SIMULTANEOUSLY

(75) Inventors: Changju Gao, Provo, UT (US); Yi Song, Provo, UT (US)

(73) Assignee: Novell, Inc., Provo, UT (US)

(*) Notice: Subject to any disclaimer, the term of this patent is extended or adjusted under 35 U.S.C. 154(b) by 78 days.

This patent is subject to a terminal disclaimer.

(21) Appl. No.: 10/948,270

(22) Filed: Sep. 22, 2004

Related U.S. Application Data

(63) Continuation-in-part of application No. 09/636,293, filed on Aug. 10, 2000, now Pat. No. 6,898,650.

(60) Provisional application No. 60/196,424, filed on Apr. 12, 2000.

(51) Int. Cl.
*G06F 12/00* (2006.01)
*G06F 7/00* (2006.01)

(52) U.S. Cl. .......................................... 710/200; 707/1

(58) Field of Classification Search ........ 710/200, 710/220, 240–244, 260–261; 707/1–3, 7–9; 709/1, 100–106
See application file for complete search history.

(56) References Cited

U.S. PATENT DOCUMENTS

| | | | |
|---|---|---|---|
| 4,482,956 A | 11/1984 | Tallman | |
| 5,161,227 A | 11/1992 | Dias et al. | |
| 5,303,368 A | 4/1994 | Kotaki | |
| 5,485,607 A | 1/1996 | Lomet et al. | |
| 5,745,747 A | 4/1998 | Chang et al. | |
| 5,745,757 A | 4/1998 | Lecourtier | |
| 5,870,764 A * | 2/1999 | Lo et al. | 707/203 |
| 5,895,494 A | 4/1999 | Scalzi et al. | |
| 6,032,217 A | 2/2000 | Arnott | |
| 6,295,610 B1 * | 9/2001 | Ganesh et al. | 714/19 |
| 6,412,034 B1 * | 6/2002 | Chan | 710/200 |

OTHER PUBLICATIONS

IBM Technical Disclosure Bulletin No. NN9108329, "Modified Multiple Locking Facility", Aug. 1991, IBM.*

* cited by examiner

*Primary Examiner*—Mark H. Rinehart
*Assistant Examiner*—Faisal Zaman
(74) *Attorney, Agent, or Firm*—Marger Johnson & McCollom, P.C.

(57) ABSTRACT

A queue includes a plurality of containers. Each container includes a lock. Clients, possibly in a multiprocessor system, can simultaneously access the queue, each client locking only a single container as needed. The clients can access the queue without using a lock manager, directly accessing the container locks to determine whether the containers are in use.

22 Claims, 8 Drawing Sheets

QUEUEING METHOD SUPPORTING MULTIPLE CLIENT ACCESSES SIMULTANEOUSLY

RELATED APPLICATION DATA

This application is a continuation-in-part of U.S. patent application Ser. No. 09/636,293, filed Aug. 10, 2000, now U.S. Pat. No. 6,898,650 which claims priority from U.S. Provisional Patent Application Ser. No. 60/196,424, filed Apr. 12, 2000.

FIELD OF THE INVENTION

This invention pertains to queueing systems and more particularly to a queueing system supporting multiple simultaneous accesses.

BACKGROUND OF THE INVENTION

Queues are commonly used in data processing systems. A large number of queues are widely used by system kernels to control the reusable hardware and/or software resources. For example, the schedulers of operating systems usually use queues to receive user requests, and dispatch jobs according to the queues.

Generally, a queue includes a plurality of entries (or elements), in which each element is a unit of the queue and usually contains user data. There are two broad categories of queues based on their implementation: arrays and linked lists. Elements in an array are usually located next to each other, while elements in a linked list contain the addresses of other elements. Array queues are easy to manage but generally have a maximum number of possible entries. Linked list queues require a slightly more complicated management scheme, but their size is bounded only by available storage space.

A queue usually has two kinds of clients, producers and consumers. A producer generates data and puts them into the queue, while a consumer retrieves data from a queue. Client accesses of a queue include inserting an element, deleting (or removing) an element, searching for an element and testing whether a queue is empty. Creating and destroying the queue itself can also be considered forms of client access.

Multiprocessing (MP) allows two or more processors to execute separate instruction streams in relation to a shared main storage simultaneously. MP has been recognized as presenting special problems for queue access. For example, the integrity of a queue may be affected if one processor tries to insert an element before another processor completes its insertion.

In the past, there were generally two ways to solve this problem. One solution uses locks to guarantee exclusive access to the queue by one client. The other solution limits client access points (where clients can insert/delete elements) and provides operations to set and swap conditions atomically. Both approaches limit the number of clients that can access the queue simultaneously, resulting in poor efficiency of existing queuing methods in MP environments.

U.S. Pat. No. 4,482,956, entitled "Parallel Queuing Methods," issued Nov. 13, 1984, discloses a way to allow multiple insertion accesses to a queue simultaneously. However, clients have to serialize operations to search or retrieve data from a queue: i.e., only one processor can search or retrieve data at a time. The '956 patent can only be applied to simple linked lists with fix access points of insertion and deletion.

The previous solutions (including the '956 patent) do not solve the problem. They fail to separate the structure of the queue from the data the queue contains. The previous solutions use either locks or doors (access points) to prevent multiple accesses to the queue. Although many processors can compete for a door, only one processor can access the door at a time.

U.S. Pat. No. 6,412,034, entitled "Transaction-Based Locking Approach," issued Jun. 25, 2002, teaches a system and method for locking resources in an environment. Rather than limiting resources to individual processes, the '034 patent describes how related processes can be granted simultaneous access to a resource. Upon receiving a request to access a resource, a centralized lock manager LM checks to see if the resource is currently locked. If so, the lock manager LM determines the transaction with which a process is associated. If the process is associated with the same transaction as the process that has locked the resource, then the lock manager LM allows the second process access to the resource. Otherwise, the lock manager LM denies the second process access to the resource.

The '034 patent also fails to solve the problem, in that it requires a lock manager. The lock manager LM acts as a single point of access for the system, in that before any process can use a resource, the process has to be granted access by the lock manager LM. All requests for resources have to funnel through the lock manager. If the lock manager is busy servicing one request, other requests have to wait, which can be inefficient.

Accordingly, a need remains for a queueing system that allows for efficient queue use and management in an MP environment with multiple simultaneous queue accesses.

SUMMARY OF THE INVENTION

An embodiment of the invention involves a queueing system. The queueing system includes containers, each container capable of storing data and including a container lock. A queue head locates the first container. Clients, operating independently, are capable of locking individual containers in the queueing system, without using a lock manager.

An advantage of the invention is that the container locks, by being with the containers, are decentralized. In systems with many containers and many clients operating in parallel, that the system can operate without using a lock manager makes the system more efficient than a system using a lock manager.

DETAILED DESCRIPTION OF THE PREFERRED EMBODIMENT

Figure 1:
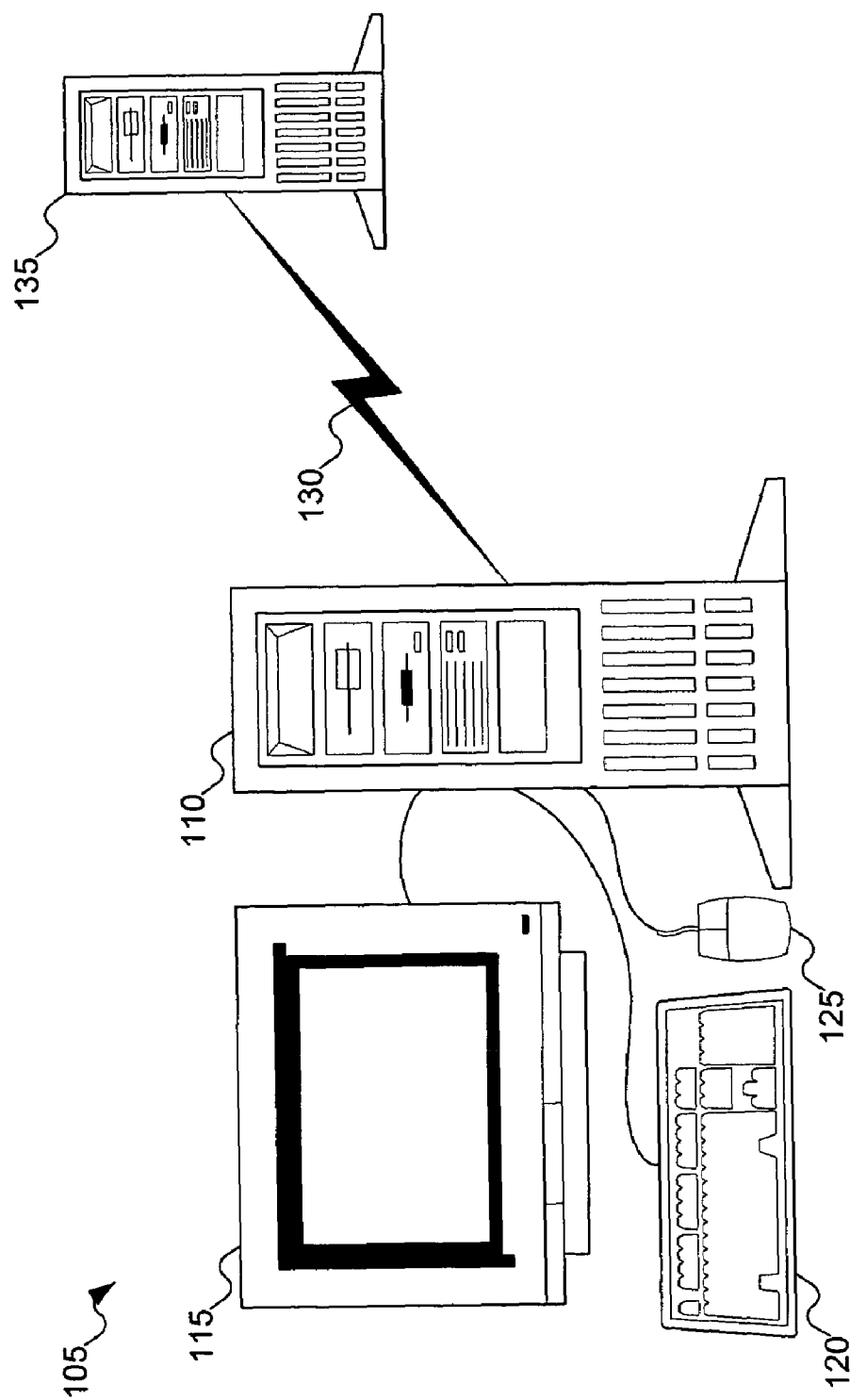
FIG. 1 shows a computer system on which a queue allowing simultaneous access can be implemented.

FIG. 1 shows a computer system 105 on which a method and apparatus for using a queue allowing multiple simultaneous accesses. Computer system 105 conventionally includes a computer 110, a monitor 115, a keyboard 120, and a mouse 125. Optional equipment not shown in FIG. 1 can include a printer and other input/output devices. Also not shown in FIG. 1 are the conventional internal components of computer system 105: e.g., one or more central processing units, memory, file system, etc.

Computer system 105 can be a standalone system running a multiprocessing (MP) environment, or it can be part of a network. For example, in FIG. 1, computer system 105 is connected by network connection 130 to server 135. A person skilled in the art will also recognize other possible configurations.

Figure 2:
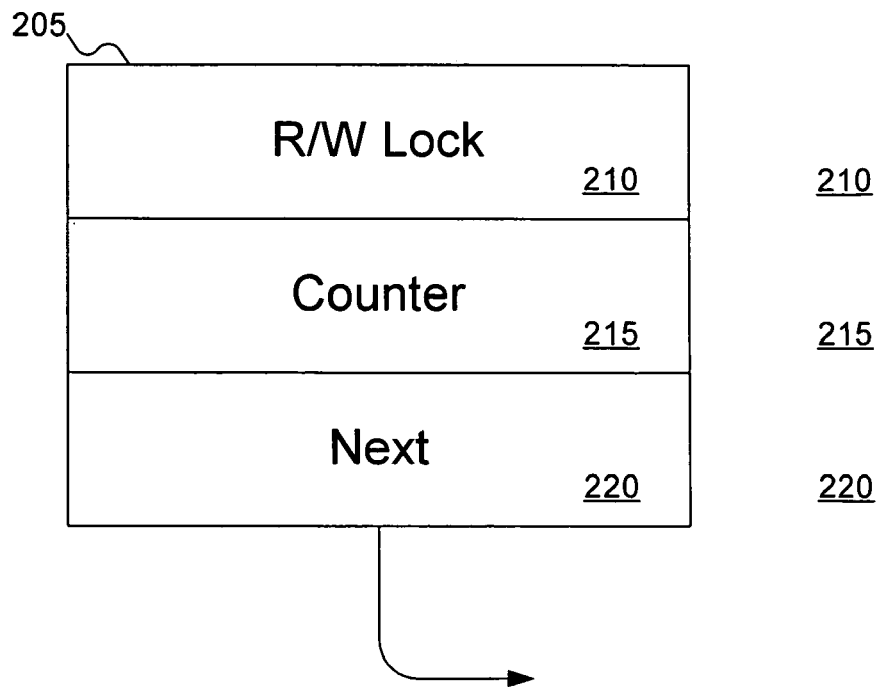
FIG. 2 shows a queue head for a queue according to the preferred embodiment of the invention implemented on the computer system of FIG. 1.

FIG. 2 shows a queue head for a queue according to the preferred embodiment of the invention implemented on the computer system of FIG. 1. In FIG. 2, queue head 205 includes read/write lock 210 (sometimes also called a queue lock), counter 215, and next pointer 220. Read/write lock 210 indicates whether the queue is locked for reading or writing. When clients wish to access containers in the queue, they lock the queue for reading. There can be as many simultaneous clients reading the queue as desired. In the preferred embodiment, when the queue is locked for reading, the manager cannot perform maintenance, but must wait until all clients of the queue have released read/write lock 210. When the manager wishes to perform maintenance on the queue, the manager locks the queue for writing. In the preferred embodiment, while the queue is locked for writing by the manager, no-one else can use the queue. Clients must wait until the manager releases read/write lock 210 before they can access containers in the queue.

Returning to FIG. 2, counter 215 indicates how many containers in the queue contain data for retrieval (i.e., how many containers have their data valid flags set; see below with reference to FIG. 3). Consumers can check counter 215 before searching the queue for a container with data; if counter 215 indicates that no containers hold data, the consumer can then block until data is inserted into the queue. Since multiple clients may try to update counter 215 simultaneously, atomic operations or locks can be used to guarantee exclusive access to the counter. Even so, counter 215 may be inaccurate for short periods of time, but will become correct almost immediately.

Returning to FIG. 2, next pointer 220 points to one of the containers in the queue. Note that it does not matter which container in the queue next pointer 220 points to, so long as all containers are accessible. Thus, the organization of the queue is not relevant to the invention, and the invention is equally applicable to different queue implementations. For example, the queue can be structured as a singly linked list, a doubly linked list, a circular list, or an array. Further, the invention is applicable to priority queues (queues in which the containers are each assigned a priority, and containers with higher priorities are used before containers with lower priorities. Finally, although all of the above-described queues are accessed deterministically, the invention is applicable to queues whose containers are accessed non-deterministically. (Deterministic access means that, for a given sequence of steps used to access the queue, the same container will be located each time. Non-deterministic access means that the same sequence of steps can result in a different container.) This can be important, as MP environments tend to behave as if they were non-deterministic.

FIG. 2 shows only the elements of queue head 205 in the preferred embodiment. A more complex head can have more information regarding the queue. For example, queue head 205 can include a counter indicating the total containers in the queue. Or queue head 205 can include a counter indicating the number of empty containers in the queue, paralleling counter 215. But unlike consumers (which must block if there is no data in the queue), producers can request the manager to allocate more containers for the queue if all the containers in the queue contain data.

Figure 3:
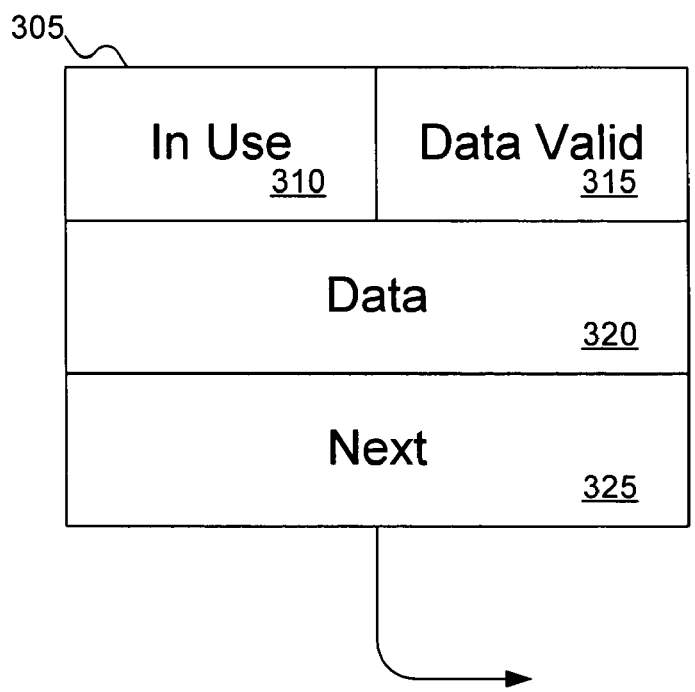
FIG. 3 shows a container for a queue according to the preferred embodiment of the invention implemented on the computer system of FIG. 1.

FIG. 3 shows a container for a queue according to the preferred embodiment of the invention implemented on the computer system of FIG. 1. In FIG. 3, container 305 includes in-use and data valid flags 310 and 315, data field 320, and next pointer 325. In-use flag 310 indicates whether the container is being used at the current time (in other words, whether or not the container is available for use). In-use flag 310 is the preferred embodiment for a container lock, which allows only one client to use a container at a time. Data valid flag 315 indicates whether a container holds valid data. But data valid flag 315 is not absolutely required, and can be part of data field 320.

Returning to FIG. 3, data field 320 stores the data in the container. The type of data stored in the container is generally not limited, although queues designed to store specific types of data are possible. Similarly, the amount of data stored in the container is generally not limited. Finally next pointer 325 points to the next container in the queue (or, if the queue has an end and the current container is the last container in the queue, next pointer 325 is a null pointer).

FIG. 3 shows only the elements of container 305 in the preferred embodiment. A more complex container can optionally contain some attributes (such as type, length, and priority) of the data the container contains.

Figure 4A:
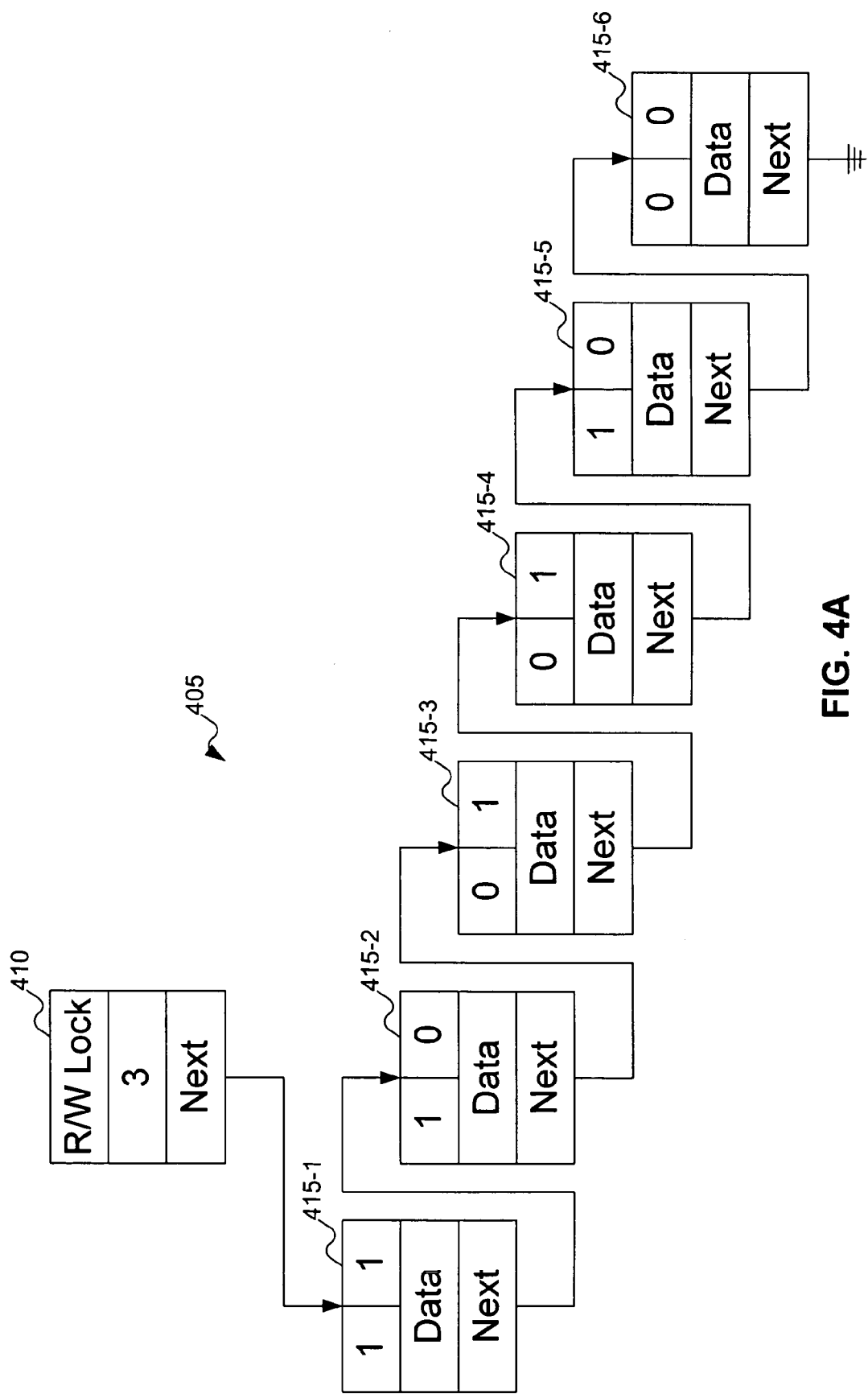
FIGS. 4A and 4B show a queue constructed from the queue head of FIG. 2 and multiple containers of FIG. 3 before and after accessing one of the containers on the computer system of FIG. 1.
Figure 4B:
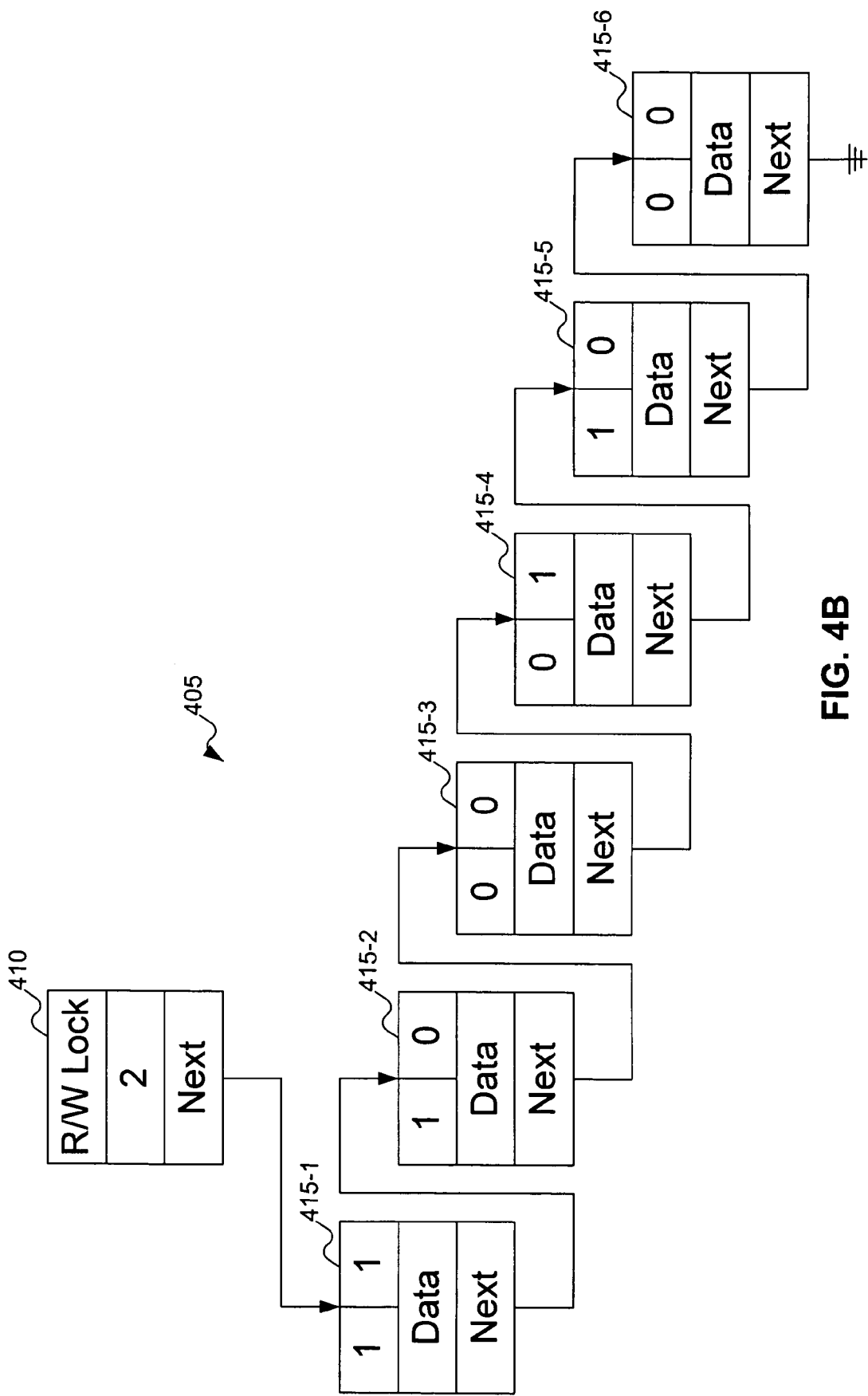

FIGS. 4A and 4B show a queue constructed from the queue head of FIG. 2 and multiple containers of FIG. 3 before and after accessing one of the containers on the computer system of FIG. 1. In FIG. 4A, queue 405 has queue head 410 and six containers 415-1 to 415-6. In queue 405, containers 415-1, 415-2, and 415-5 are in use, while containers 415-1, 415-3, and 415-4 hold valid data. In FIG. 4B, a client has accessed container 415-3 and processed the data in the queue. The client has also set the data valid flag for container 415-3 to "0," indicating that container 415-3 no longer contains valid data. Finally, note that the client has decremented the counter in queue head 410, indicating that now only two containers in the queue hold valid data.

The utility of containers forming the queue is best seen in comparison to a queue in the prior art. In the prior art, clients usually locked the whole queue and directly accessed the queue. Clients could insert new elements into the queue and remove elements from the queue. In contrast, in the instant invention, the containers are semi-permanent objects. Clients can access the contents of containers and lock them for individual use, but cannot create or destroy containers within the queue. (The containers are called semi-permanent because the manager can create and delete containers in the queue, but clients cannot.)

As discussed above, the invention is applicable to all kinds of queue structures. The invention separates queue maintenance and client access. Client accesses do not directly change the containers that form a queue, and thus enable multiple accesses to the queue. As a result, queue performance improves.

Figure 5A:
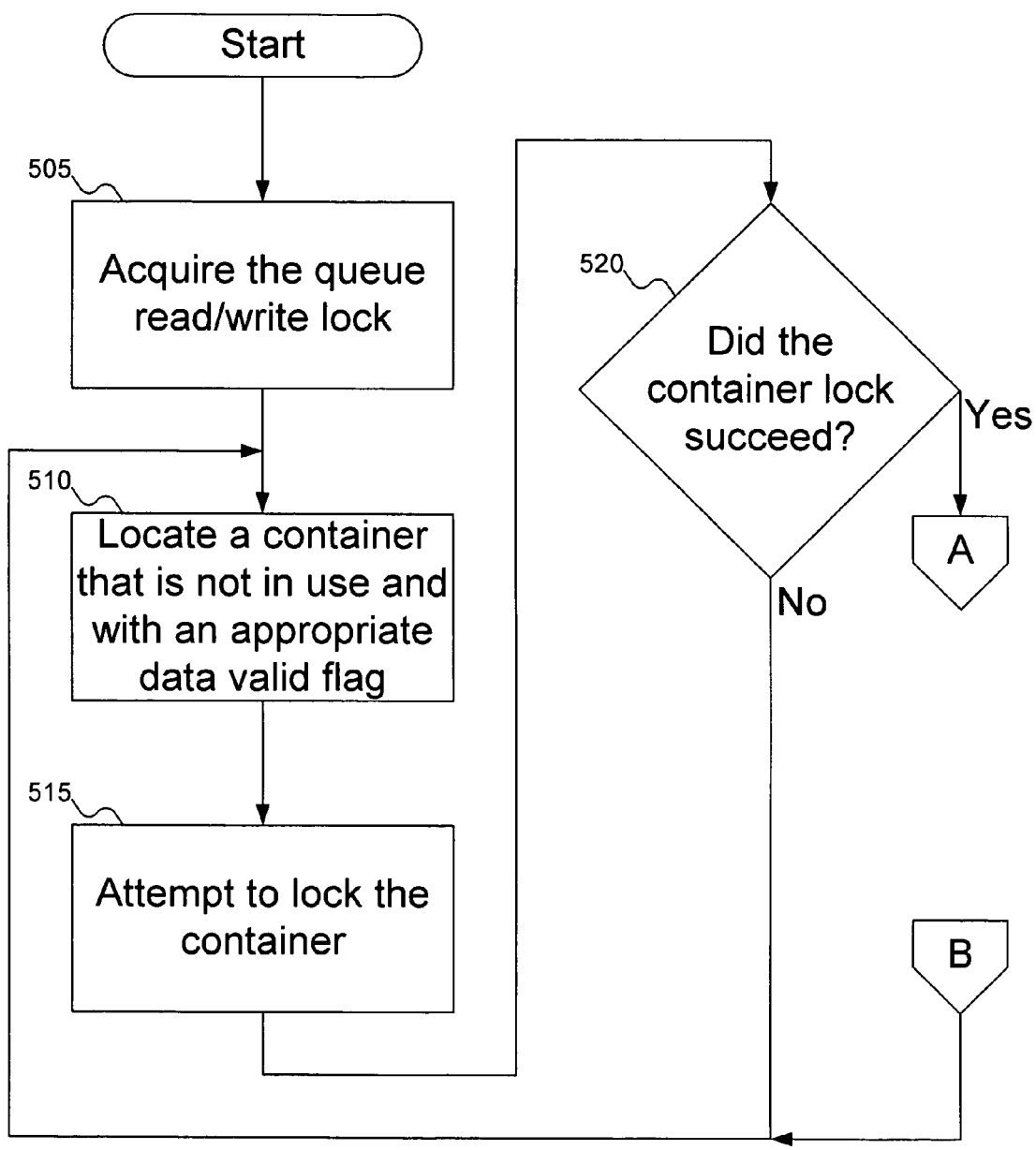
FIGS. 5A and 5B show a flowchart of a method for accessing and using a container in a queue implemented on the computer system of FIG. 1.
Figure 5B:
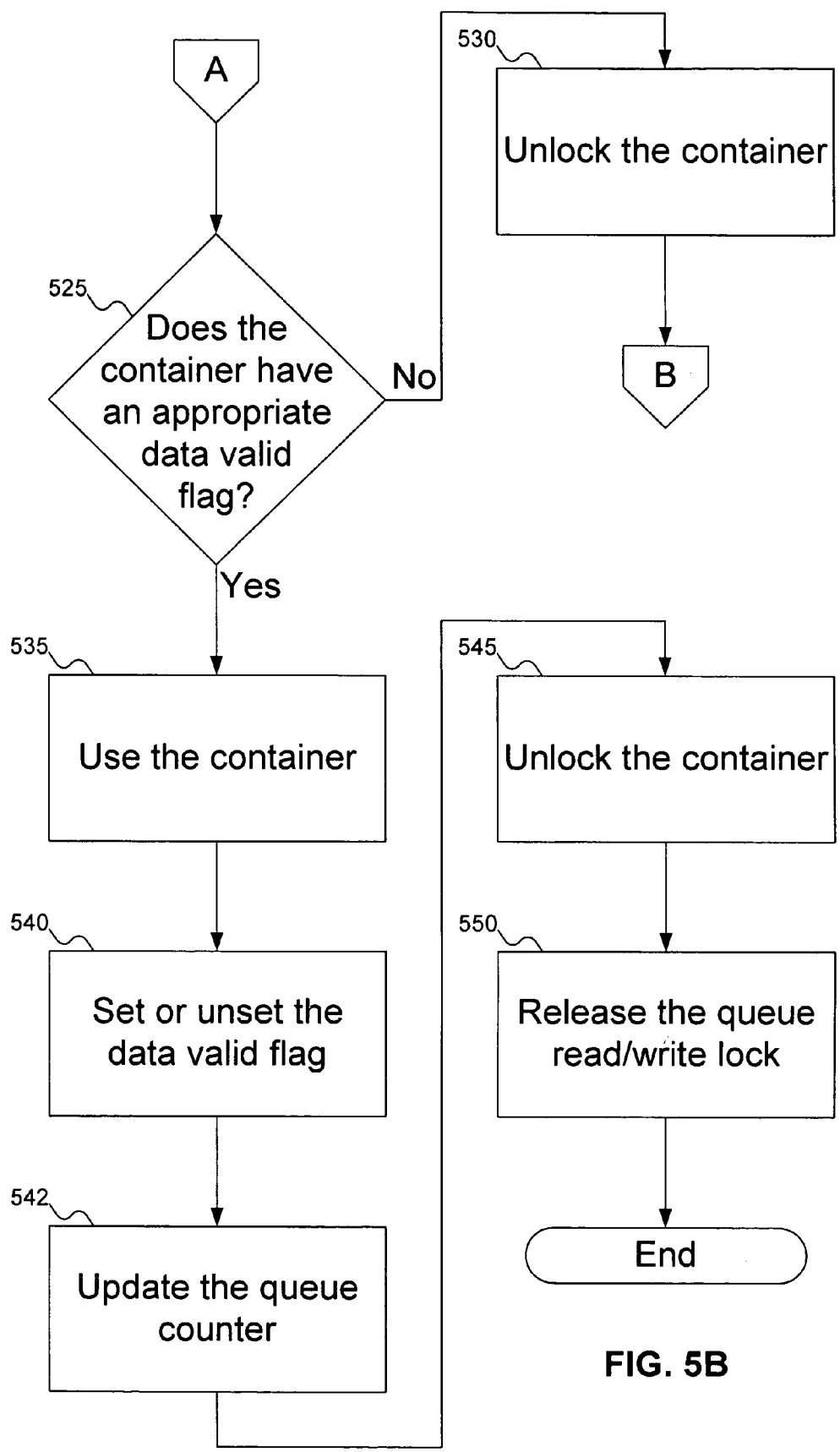

FIGS. 5A and 5B show a flowchart of a method for accessing and using a container in a queue implemented on the computer system of FIG. 1. At step 505, the client acquires the read/write lock for the queue. The request for the read/write lock is usually granted because any number of clients can simultaneously access the queue. Only if the manager has been granted the read/write lock will the client be denied the read/write lock.

At step 510, the client locates a container in the queue. At step 515, attempts to lock the container, so that no other client can use the container. In the preferred embodiment, an atomic set and swap operation is used to try to lock the container by setting the in-use flag to 1. An atomic set and swap operation sets a field to the given value and returns the old value atomically (in one indivisible computer operation). Many modern computer systems (e.g., IBM mainframes) have such instructions, and most MP environments (e.g., Novell's Multiple Processor Kernel) include such functions. Generally, the atomic set and swap operation will return the value of the field being accessed to the caller; the value returned gives the caller an indication of whether the operation succeeded. For example, the atomic set and swap operation will return the value "0" if the container was not in use before the atomic set and swap operation was performed. On the other hand, if the container was locked for use by another client before the client was able to perform the operation, the atomic set and swap operation will return the value "1."

At step 520, the client checks to see if the container was successfully locked. If the atomic set and swap operation returned the value 0, the client has gained exclusive access rights to the container. Otherwise, the client must return to step 510 and locate another container. At step 525 (FIG. 5B), the client checks to see if the data valid flag is still set appropriately. If the client is looking for an empty container and the selected container has data, or if the client is looking for a container with data and the selected container is empty, then at step 530 the client unlocks the container and returns to step 510 (FIG. 5A). Otherwise, at step 535 the client uses the container as desired. At step 540, the client sets or unsets the data valid flag as needed. At step 542, the client updates the queue counter. If the client removed data from the container, the client decrements the queue counter, informing all clients that there is one less container storing valid data. If the client inserted data into the container, the client increments the queue counter, informing all clients that there is one more container storing valid data. At step 545, the client unlocks the container, and at step 550, the client releases the read queue.

Although not shown in FIGS. 5A and 5B, consumer clients can check the queue counter before attempting to obtain the read/write queue. As discussed above, the queue counter indicates the number of containers in the queue that hold valid data. If the queue counter is zero, then the consumer client knows that there is no data in the queue to consume. The lets the consumer client avoid unnecessarily searching the queue for data.

Table 1 shows pseudo-code of the process for removing data from a container not currently in use. A person skilled in the art will recognize how the pseudo-code can be modified for a client to insert data into the queue.

TABLE 1

```
return_valid = FALSE;
if (Acquire_Read_Lock (queue->lock) != NULL)
{
    for (ptr = First_Container (queue); !return_valid && ptr;
            ptr = Next_Container (ptr))
    {
      if (!ptr->in_use && ptr->data_valid)
      {
        if (Atomic_Set (ptr->in_use, 1) == 0)
        {
          if (ptr->data_valid)
          {
            Data_Copy (return_data, ptr->data);
            ptr->data_valid = FALSE;
            return_valid = TRUE;
            Atomic_Decrement (queue->counter);
```

TABLE 1-continued

```
          }
          ptr->in_use = 0;
        }
      }
    }
    Release_Read_Lock (queue->lock);
}
return (return_valid, return_data);
```

Since the queue structure does not change (the number of containers in the queue and their order do not change), the method of FIGS. 5A and 5B can be performed simultaneously by any number of processors. Even more, different procedures can be performed at the same time by different processors. So, for example, at the same time that one client is removing data from the queue, another processor can insert data into the queue.

A manager is responsible for maintenance of the queue. Although typically a person (e.g., a queue administrator), the manager can be a software routine or utility designed to monitor queue performance. The manager is responsible for creating and destroying containers as the queue's size changes. The manager can also perform maintenance on the queue. As discussed above, because the manager cannot perform his duties while clients are accessing the queue, the manager needs to acquire the read/write lock exclusively to access the queue (in comparison with clients, which can access the queue simultaneously).

The manager is the only one who modifies the structure of the queue, freeing empty containers and allocating new containers. When a queue is initialized, the manager can choose a default number of containers for the queue. When it is time to increase or decrease the number of containers in the queue, the manager can step in, acquire the read/write lock and modify the queue. Client cannot access the queue while the manager is holding the read/write lock. If desired, the manager can also rearrange the containers in the queue. If individual containers within the queue have properties (e.g., in a priority queue, a container can store only data of a specific priority), the manager can also change the container properties.

There are many ways to reduce manager's interventions. One good way is to set a threshold density (the ratio of containers-in-use/total-containers or of containers-having-data/total-containers) of the queue. If the density of the queue exceeds the thresholds, a flag can be set to signal the manager that it is time for queue maintenance.

The manager can also use statistics to track container usage. For example, the container can store its last time of access. Then, when the manager performs periodic maintenance, if a container has not been used for a given amount of time, the manager can decide to destroy the container as excess capacity.

The manager can also be alerted when clients are blocked for lack of containers. For example, it can happen that a client wants to use a container in the queue, but all containers are currently in use. The manager can be alerted to this situation, and can step in immediately to add containers to the queue.

Figure 6:
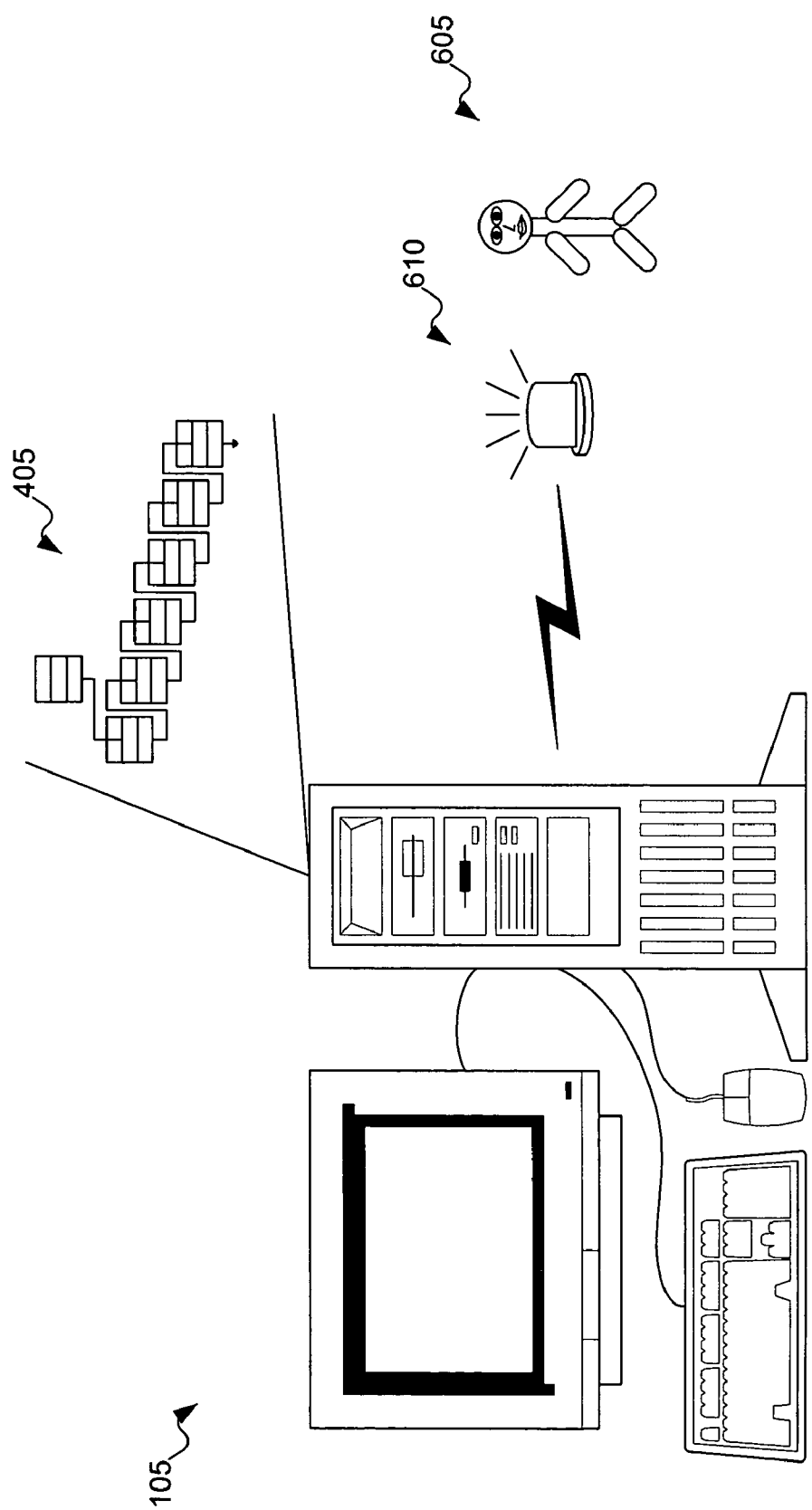
FIG. 6 shows a manager being notified that a queue on the computer system of FIG. 1 requires maintenance.

FIG. 6 shows a manager being notified that a queue on the computer system of FIG. 1 requires maintenance. In FIG. 6, computer system 105 includes queue 405. Manager 605 can maintain the queue as needed. When immediate maintenance is required (for example, when the density exceeds the threshold set for the queue), queue 405 alerts manager 605 via signal 610. (Although represented as a flashing light in FIG. 6, in practice, computer system 105 will send an electronic message of some sort to manager 605, informing manager 605 of the required maintenance.)

Figure 7:
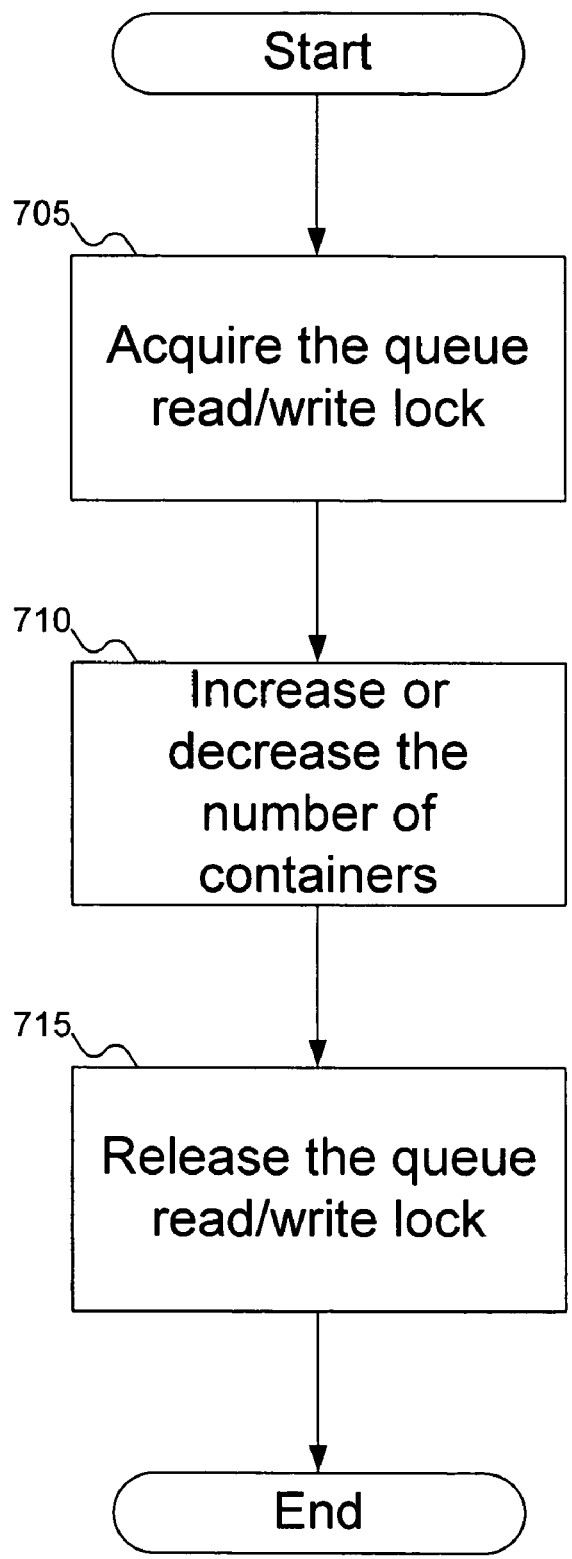
FIG. 7 shows a flowchart of a method for a manager to perform maintenance on a queue implemented on the computer system of FIG. 1.

FIG. 7 shows a flowchart of a method for a manager to perform maintenance on a queue implemented on the computer system of FIG. 1. At step 705, the manager acquires the read/write lock for the queue. This can include waiting for any clients currently using containers to finish. In the preferred embodiment, clients seeking access to containers after the manager has requested the read/write lock are blocked until the manager performs the maintenance. Otherwise, the manager may be unable to ever acquire the read/write lock (as some clients release the read/write lock, others acquire the read/write lock). However, a person skilled in the art will recognize that clients can be allowed to acquire the read/write lock ahead of the manager, provided the manager ultimately is allowed to perform the maintenance.

At step 710, the manager performs the necessary maintenance on the queue. This can include adding new containers (if the containers are always or frequently full with data) or removing existing containers (if some containers are never used). The maintenance can also include changing the structure of the queue or adding or removing attributes from the queue and the containers. Finally, at step 715, the manager releases the read/write lock, allowing any blocked clients to access the queue.

It is worth noting that, unlike the '034 patent discussed above, no lock manager is required to implement embodiments of the invention. Clients can access the containers, container locks, and container valid data flags directly. Thus, clients can determine for themselves whether containers are available and whether or not containers contain valid data, without using a lock manager.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A queueing system supporting multiple simultaneous accesses, the queueing system comprising:
    a computer;
    at least a first container and a second container, each container storing client data and including a container lock;
    a queue head stored in the computer and pointing to a first container; and
    at least a first client and a second client, the first client and the second client operating independently, the first client capable of locking the first container and the second client capable of locking the second container each without using a lock manager.

2. A queueing system according to claim 1, further comprising means for accessing the containers deterministically.

3. A queueing system according to claim 1, further comprising means for accessing the containers non-deterministically.

4. A queueing system according to claim 1, wherein the queue head includes a queue lock.

5. A queueing system according to claim 1, further comprising a manager to manage the queueing system.

6. A queueing system according to claim 5, wherein the manager is adapted to control the number of containers in the queueing system.

7. A queueing system according to claim 1, further comprising a manager notification system to notify a manager when the queueing system requires maintenance.

8. A queueing system according to claim 1, wherein the computer is part of a multiprocessor computer system.

9. A queueing system according to claim 1, wherein the queue head includes a counter indicating the number of containers storing valid data.

10. A queueing system according to claim 1, wherein the container lock associated with each container includes an in-use flag specifying whether the associated container is being used.

11. A queueing system according to claim 10, wherein the container lock associated with each container further includes a valid data flag specifying whether the associated container contains valid data.

12. A queueing system according to claim 1, the queueing system designed so that a client can directly access the container locks associated with each container.

13. A queueing system according to claim 1, wherein the container locks for the first container and the second container are decentralized.

14. A method for using a queue supporting multiple simultaneous accesses, the method comprising:
    locating a container by a client;
    acquiring a lock for the container directly from the container by the client without using a lock manager;
    using the container by the client; and
    releasing the container lock by the client.

15. A method according to claim 14, wherein:
    acquiring a lock includes acquiring a read/write lock for the queue; and
    releasing the container lock includes releasing the read/write lock.

16. A method according to claim 15, wherein:
    the method further comprises acquiring the read/write lock for the queue by a manager; and
    acquiring a read/write lock for the queue includes waiting for the manager to release the read/write lock.

17. A method according to claim 15, wherein acquiring a read/write lock for the queue includes simultaneously allowing multiple accesses to containers in the queue.

18. A method according to claim 14, wherein the method is implemented in a multiprocessor computer system.

19. A method according to claim 14, further comprising adjusting a queue counter.

20. A method according to claim 14, wherein acquiring a lock for the container includes testing to determine if the container is already being accessed.

21. A method according to claim 20, wherein acquiring a lock for the container includes locating a second container if the container is already being accessed.

22. A computer-readable medium containing a program to use a queue supporting multiple simultaneous accesses, the program being executable on the computer system to implement the method of claim 14.

* * * * *